Feb. 7, 1967   W. O. PETERSON   3,302,306
METHOD OF AND MEANS FOR INFORMATION DETECTION
Filed May 28, 1965   2 Sheets-Sheet 1

INVENTOR
WALTER O. PETERSON
BY
Dick, Zachey, McKee & Thomt
ATTORNEYS

Feb. 7, 1967  W. O. PETERSON  3,302,306
METHOD OF AND MEANS FOR INFORMATION DETECTION
Filed May 28, 1965  2 Sheets-Sheet 2

INVENTOR
WALTER O. PETERSON
BY
Dich, Zarley, McKee & Thomte
ATTORNEYS

United States Patent Office 3,302,306
Patented Feb. 7, 1967

3,302,306
METHOD OF AND MEANS FOR INFORMATION DETECTION
Walter O. Peterson, Enid, Okla., assignor to Polarknown, Inc., Eugene, Oreg., a corporation of Oregon
Filed May 28, 1965, Ser. No. 459,573
4 Claims. (Cl. 35—9)

The principal object of this invention is to use two or more light passing polarized plastic members to indicate correct and/or incorrect information, it being appreciated that if two transparent or translucent polarized plastic sheets are placed together in certain particular relative positions one to the other, the two members will still be collectively transparent, while if one member is rotated to a given position relative to the other, the two sheets will be collectively non-transparent.

A further object of my invention is to provide a question and answer device for test examinations that utilizes polarized plastic members.

A still further object of my invention is to provide a question and answer means that may selectively give or not give the answers to the one immediately taking examination.

A still further object of my invention is to provide an information means that lends its data to automatic machine evaluation.

A still further object of my invention is to provide an improved method of teaching and/or imparting information.

Still further objects of my invention are to provide means for information detection that is economical in manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Although the drawings and the major portion of the descriptive data contained herein, relate to the use of polarized discs or lenses used in question and answer tests or informative teachings, obviously the principal may well be used in obtaining or imparting all types of valuable information. Furthermore, the principal herein considered lends itself to automatic light sensitive data processing machines and computers. An illustration would be the automatic machine routing of mail and like. Letters going to different destinations would have different arranged polarized plastic tabs, windows or like, and as they passed by master polarized sheets, the equipment could sense the light characteristic and automatically pass each letter to its proper conveyance for distribution.

Figure 2:
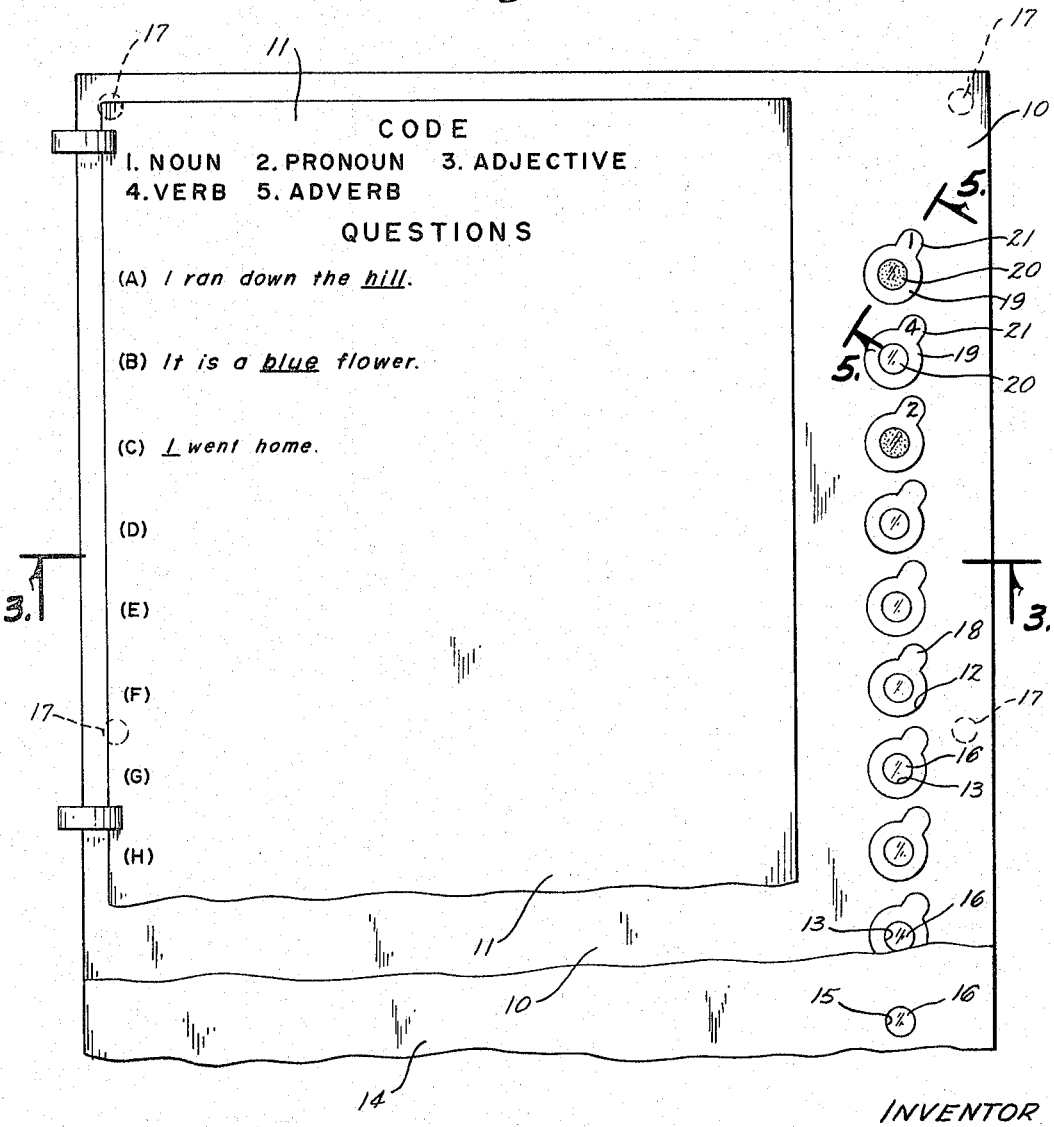
FIG. 2 is a top plan view of one form of a question and answer means using polarized plastic members.
Figure 3:
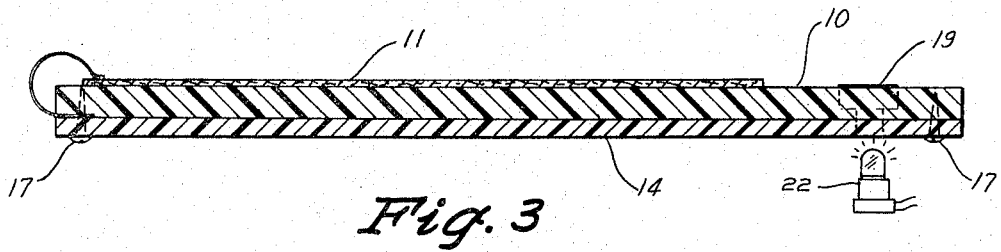
FIG. 3 is a cross-sectional view of the device shown in FIG. 2 taken along line 3—3.
Figure 4:
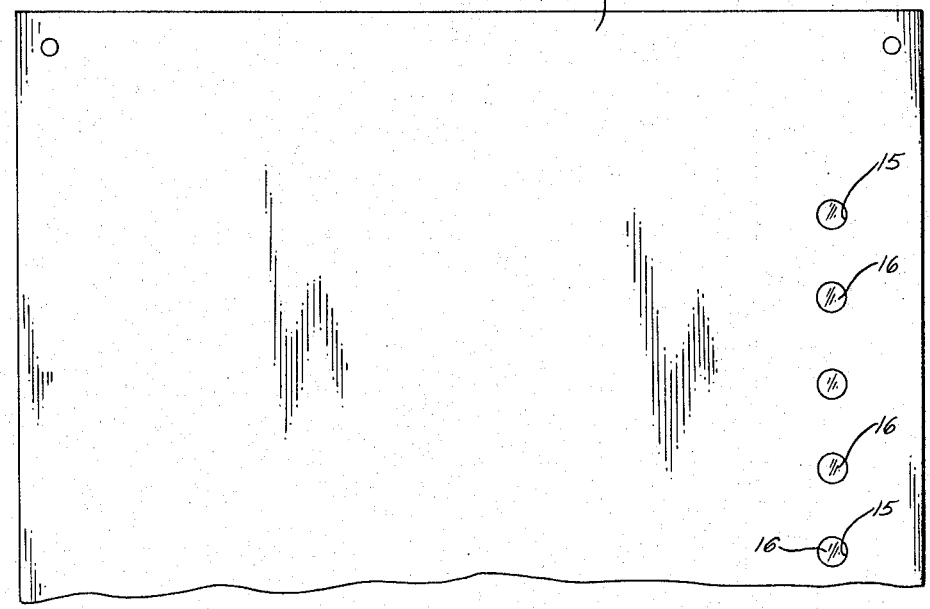
FIG. 4 is a plan view of the detachable bottom section of the device shown in FIG. 2.
Figure 5:
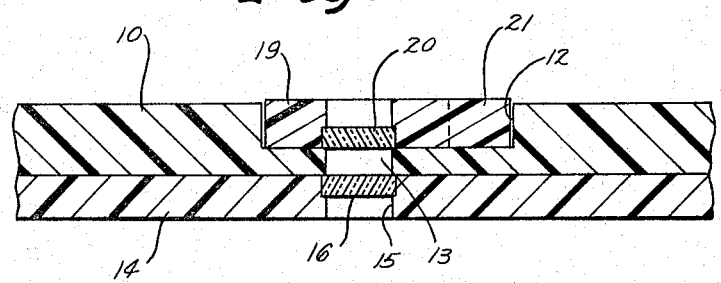
FIG. 5 is an enlarged sectional view taken on line 5—5 of FIG. 2 and illustrates one method of aligning two adjacent polarized members.

Possibly the most universal use of the principal disclosed will be in the test or self education fields. In the drawings I have used the numeral 10 to designate a work board. The numeral 11 designates a question or like sheet which may be separate, attached or detachable from the board 10. This question sheet 10 may be any style or composition and the one shown is only illustrative. Arranged in any suitable manner, such as opposite each of the questions on the sheet 11, are a plurality of depressions 12. In the central area of each depression is a window hole 13. Below the board 10 is a second sheet member 14 having holes 15, registerable with the holes 13 of the work board 10. Each hole 15 is sealed with a polarized plastic member or lens 16, and each placed polarized plastic member is pre-determined and positioned so that its particular polarity will correctly correspond with a given polarized plastic disc member or lens placed in a depression above it. This back sheet 14 may be separate, attached to, or detachable from the board 10 by any suitable means such as screws or like 17. Each depression 12 has a connecting open side area 18 as shown in FIG. 2.

Figure 1:
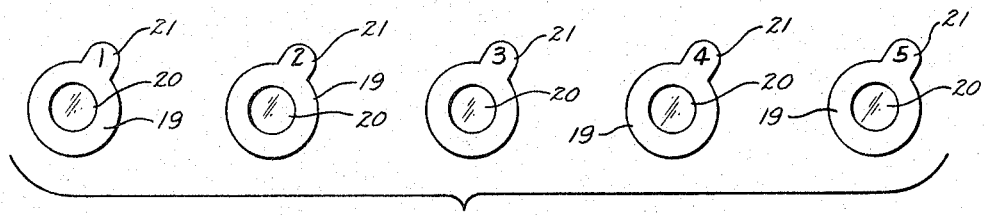
FIG. 1 is a sample plurality of discs or plates each having a polarized plastic window and adapted to be selectively placed over or rotated on other means also having polarized plastic characteristics.

FIG. 1 shows a plurality of manually handled disc plate members 19. In actual practice there should be a considerable number of these selective members from which to choose. Each disc plate member has a window enclosed with a disc or lens or polarized plastic 20, which has been installed so that its pole will be or will not be compatible with a given polarized plastic member 16 in the back sheet 14. Each disc plate member 19 has a tab or tongue 21 adapted to fit in a side area 18 of a depression 12.

If the device is to be used as an immediate teaching means or to immediately indicate to the user the correct or incorrect answer, the back sheet 14 is properly placed under the work board. As an illustration the user will attempt to correctly answer question "A." The word "Hill" is underlined, so the user must determine if "Hill" is a noun, pronoun, adjective, verb, or like. The code designates that the disc plate 20 having the number "1" is a noun. When the user places this particular disc plate in the depression opposite the question and its tab 21 in the opening 18, the two adjacent polarized plastic members will not be light transparent compatible and if the unit is placed over a light source 22, or held up to the light, the window through the plastics will be dark and the answer will therefore be correct as shown in FIG. 2. On the other hand, if the user in answering question "B" wrongly chooses the disc plate having the number "4," the opening opposite that question will be clear or transparent indicating that the user answered the question incorrectly. In the manufacture or assembly of the device the polarized windows of the disc plates 19 have been so rotated and then fixed into place that only one of the selectable disc plates will give a dark image to indicate a correct answer. The tab 21 serves as a locating or locking means for a disc plate, however other guide or control means or data may be employed so that the users may appreciate correct or incorrect answers. Clear polarized plastic cannot be detected by visual observation, but can be quickly noted when two polarized plastics are super imposed one upon the other and are rotated relative to each other until their polarity is non compatible and they cease to collectively be transparent. The device lends itself to variations such as multiple type questions. If the device is to be used as a test to be graded the instructor will retain the sheet 14, and after the one taking the test has completed the placement of the discs 19 to the best of his ability, the instructor will then replace the sheet 14 and a quick glance will indicate all answers as correct or incorrect. Obviously, this reading may also be automatically noted and recorded by automatic light sensing calculator machines. In certain instances the device will be used as a self teaching aid. In such cases the sheet 14 will be attached and the one using the device will instantly recognize and/ or interpret whether or not he used the correct disc. If the disc image is clear he will know that the selection or information is incorrect and he then can try out still other discs until the information is correct.

The same equipment may be used for different questions and/or information merely by changing the question sheets 11. Also it may be desirable to use different discs 19. However, in the manufacture and/or assembly of the various plastics their direction of polarity must be predetermined. In FIG. 1, the polarity of each of the discs has been predetermined and are different one from the other so that only one particular disc will give the correct answer. If one the other hand the discs 19 all had the same direction of polarity, then each of the disc lens 16 would have to have different polarity directions.

From the foregoing it will be appreciated that I have provided a method of determining the correctness of pre-collected and arranged data.

Some changes may be made in the construction and arrangement of my method of and means for information detection without departing from the real spirit and purpose of my invention, and it is my intention to cover by my claims, any modified forms of structure or use of mechanical equivalents which may be reasonably included within their scope.

I claim:
1. In a device for information detection;
   a workboard adapted to receive a sheet containing question indicia calling for a selection of one of a plurality of selections to be made by a user,
   apertures in said workboard which contain fixed polarized filter members having predetermined relative orientations, said apertures being adapted to receive keyed filters in a particular overlapping rotational relationship with said fixed filters,
   a set of keyed filters with identifying indicia thereon corresponding to particular selections called for by said question indicia,
   said keyed filters having polarized material therein such that light would be blocked from passing through said apertures upon the selective placement of one of said individual filters over the aperture corresponding to a correct selection by said user.
2. In combination,
   a sheet containing question indicia calling for a selection of one of a plurality of selections to be made by a user,
   a supporting means,
   polarized filter members fixed on said supporting means and positioned thereon so that light can normally pass therethrough, said filter members being arranged in predetermined relative orientations to form a corresponding relationship between each one of said fixed filter members and one of said question indicia,
   a set of keyed filters with identifying indicia thereon corresponding to particular selections called for by said question indicia,
   said supporting means being adapted to receive said keyed filters in an overlapping relationship with said fixed filters,
   said keyed filters having polarized material therein such that light would be blocked from passing through said fixed filters and said keyed filters upon the selective placement of one of said keyed filters over the fixed filter corresponding to a correct selection by said user.
3. The combination of claim 1 wherein apertures are in said supporting means, said fixed filters being contained within said apertures.
4. The method of quickly obtaining information, comprising
   taking a sheet containing question indicia calling for one of a plurality of selections to be made by a user,
   taking a plurality of fixed polarized filter members and arranging said filter members in a predetermined relative orientation to form a corresponding relationship between one each of said fixed filter members and one of said question indicia,
   taking a set of keyed polarized filter members with identifying indicia thereon corresponding to particular selections called for by said question indicia,
   moving one of said keyed filter members into a predetermined overlapping position on one of said fixed filter members whereupon the position of said one fixed filter member in relation to said one keyed filter member will be such that light will be blocked from passing through said overlapping filter members only if the question indicia corresponding with said one fixed filter corresponds to the identifying indicia on said one keyed filter member.

References Cited by the Examiner
UNITED STATES PATENTS

| | | | |
|---|---|---|---|
| 2,422,287 | 6/1947 | Bernheim et al. | 85—65 |
| 3,237,182 | 2/1966 | Berlucchi | 85—65 |

EUGENE R. CAPOZIO, *Primary Examiner.*

R. E. KLEIN, *Assistant Examiner.*